United States Patent [19]

Gleaves et al.

[11] 4,289,027
[45] Sep. 15, 1981

[54] AIRCRAFT FUEL TESTER

[76] Inventors: Donald Gleaves, 50 Somerset St., Huntington Station, N.Y. 11746; Walter Green, 6001 Arlington Blvd, Apt. 406, Falls Church, Va. 22046

[21] Appl. No.: 104,771
[22] Filed: Dec. 20, 1979
[51] Int. Cl.³ .............................................. G01F 23/14
[52] U.S. Cl. ...................................... 73/299; 73/756; 73/863.86
[58] Field of Search .................. 73/299, 301, 425.4 R, 73/756, 421 B

[56] References Cited

U.S. PATENT DOCUMENTS

| | | | |
|---|---|---|---|
| 1,259,680 | 3/1918 | Theobald | 73/299 |
| 3,011,349 | 12/1961 | Kratz | 73/421 B |
| 3,198,016 | 8/1965 | Poorman | 73/421 B |
| 3,872,886 | 3/1975 | Shotmeyer | 73/299 |
| 3,986,398 | 10/1976 | Laymance | 73/299 |

Primary Examiner—Donald O. Woodiel
Attorney, Agent, or Firm—Burton S. Heiko

[57] ABSTRACT

A device to measure both the fuel level in high wing aircraft fuel tanks and check for water and other impurities in the fuel tanks. This invention is used from the underside of the wing and is inserted from below into the fuel tank sump valve. The device measures both the height of the fuel within the tank to determine how full it is and at the same time drains fuel into the device for visual inspection of water and other impurities. The device can be used to determine both fuel level and impurities at the same time or separately.

8 Claims, 5 Drawing Figures

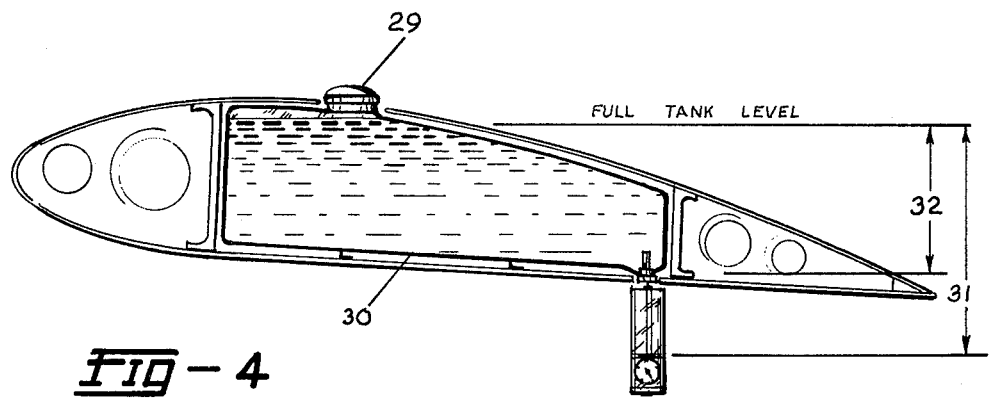
_Fig-4_
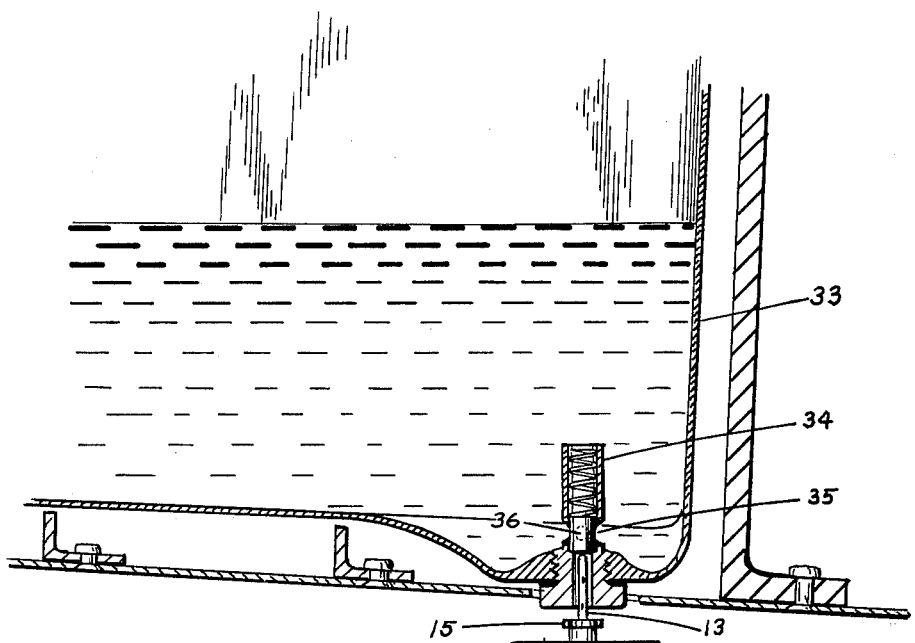
_Fig-5_

AIRCRAFT FUEL TESTER

BACKGROUND OF THE INVENTION (a) Field of the Invention

This invention is concerned with the measurement of fuel in the fuel tanks of the airplane together with the visual inspection of the fuel, so measured for water and other impurities, which inspection is made from the ground on the underside of the wing. Previous to this invention the fuel tank cap on the top side of the wing had to be opened and the fuel level in the tank visually verified. If the level is not immediately apparent then a dip stick has to be inserted into the opening and the amount of fuel in the tank estimated from the mark on the dip stick.

Since fuel is lighter than water and most other contaminants, a check for impurities cannot be made from the top side of the wing. The pilot or other inspector must drain a sample of fuel from the drain sump valve on the underside of the wing to check for the presence of water and other pollutants. Aviation fuel is color-coded by octane. However, if different grades of octane fuel are mixed, the colors usually cancel each other out, resulting in a clear mixture. But a check to determine how much fuel is in the wing tanks can only now be made from the topside of the wing and the fuel tank cap must be taken off and a visual inspection made of the tank or a dip stick used. Inclement weather and slippery conditions could make this inspection difficult and hazardous since it requires climbing onto the wing and removing the fuel caps to ascertain the fuel level. This invention allows both checks to be made at the same time, or even separately, from the convenient safety of the underside of the wing.

(b) Description of the Prior Art

Standard procedure on all aircraft involves at least two (2) separate tests, one for fuel level, the other for water and other contaminants, each test separately taken from only different parts of the aircraft. It can, and often does, involve the safety of the person on top of the wing both in getting there and staying there, not to mention the necessity of opening and securing the fuel caps. No device is currently available which would be more reliable, accurate or convenient.

One sort of present test for fuel level involves a pipette like device which is placed into the fuel tank with the cover removed either pre-calibrated or used with a calibration card. The AOPA Air Safety Foundation Airmanship Refresher Course advises its members not to take for granted the fuel quantity gauges for granted but to always make a visual check of the fuel. In an October 1979 newslatter of the same AOPA, located in Washington, D.C., it advises its members that if they don't have a way of peering into the high wing fuel tanks think about carrying a small light-weight ladder to carry with them. If that's impractical, they advise their members, borrow the FBO's ladder. Checks for pollutants are advised to be made by draining the tank by using the fuel tank sump valve.

Considering the inconvenience of making visual checks of the fuel level and especially if it has to be made during bad weather no doubt such inspection has been "overlooked" in the past. And bad weather must result in its quota of accidental injuries.

SUMMARY OF THE INVENTION

A device consisting of a cylinder made from some transparent material housing for most of its length a standpipe, with its open end containing the end of the standpipe, which end of the standpipe terminates in a pin, perforated at its sides, and below the perforations a seal. At the other end of the standpipe it flairs out into a circular disc, open at its center, and makes a tight fit with a diaphragm just below it around the inside circumference, sealed by a gasket between them, leaving a small space between the disc and the diaphragm. Attached to the lower part of the diaphragm is a smaller disc which rests against a movable arm which arm when it is moved turns a pinion gear attached to and moving a pointer around a dial set in the bottom of the device. The tension on the arm can be increased or decreased by means of a spring which can be adjusted by a screw set at the bottom of the cylinder touching the spring. In use the cylinder with its open end up is inserted into the bottom of the wing tank at the opening of the wing tank sump valve. The perforated end of the standpipe is inserted into wing tank sump valve pushing up a poppet valve with the perforated end of the standpipe being smaller in circumference than the opening leading to the poppet valve. As the poppet valve is raised openings in the housing surrounding the poppet valve are now cleared allowing fuel at the bottom of the tank to flow into the cylindrical device for a sample of the fuel content to be taken. If the end of the standpipe is forced further into the valve the seal around the end of the standpipe is forced against the opening of the valve restricting the flow of fluid only into the standpipe and from there through the hole in the disc at the bottom of the standpipe making one continuous pres- from the column of fuel in the fuel tank down through the standpipe and against the diaphragm below the end of the standpipe.

The pointer on the dial is pre-set to read empty so that the pressure of the column above the diaphragm forces the arm to move against the resistance of the spring. The device in use is first calibrated against a full wing tank of whatever design or manufacture to be tested and then can be used to test and measure similar wing tanks in different planes.

It is the principal purpose of this invention to provide at one and the same time a test for both fuel inventory and water and other contaminants from a convenient and safe position under the wing of an airplane.

Another purpose of this invention is to provide for an external mechanical measurement of the fuel level in the wing tanks of an airplane from under the wing.

Another purpose of this invention is to provide a quick and efficient way to test for water and other contamination in the fuel tanks of an airplane.

In the best mode the cylinder is so built that not only can it guage the fuel level in the wing tank but also provides room in the device for visual inspection of the fuel drawn from wing tank sump valve. In practice the end of the standpipe can be partially inserted into the wing tank sump valve first filling the cylinder with fuel and then pushed further into the sump valve to draw the fuel into the standpipe and then against the diaphragm for a fuel level measurement.

BRIEF DESCRIPTION OF THE DRAWINGS

FIG. 4 is a vertical cross sectional view through a wing showing the fuel tank and how the device is placed into the fuel tank; and FIG. 5 is a detailed view of the fuel tank and the fuel tank sump valve with the device shown inserted into the valve.

DETAILED DESCRIPTION OF THE DRAWINGS

While the invention will be described in connection with the preferred embodiments, it will be understood that it is not intended to limit the invention to these embodiments. On the contrary, it is intended to cover all alternatives, modifications and equivalents as may be included within the spirit and scope of the invention as defined by the appended claims.

Figure 1:
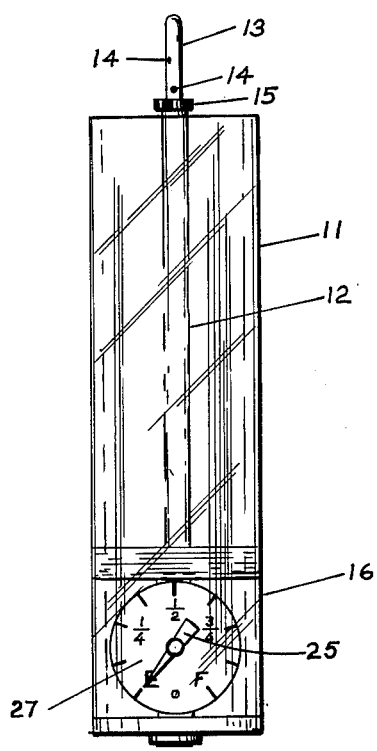
FIG. 1 is a front elevational view of the device showing the standpipe and the dial at the bottom of the device thereof.
Figure 2:
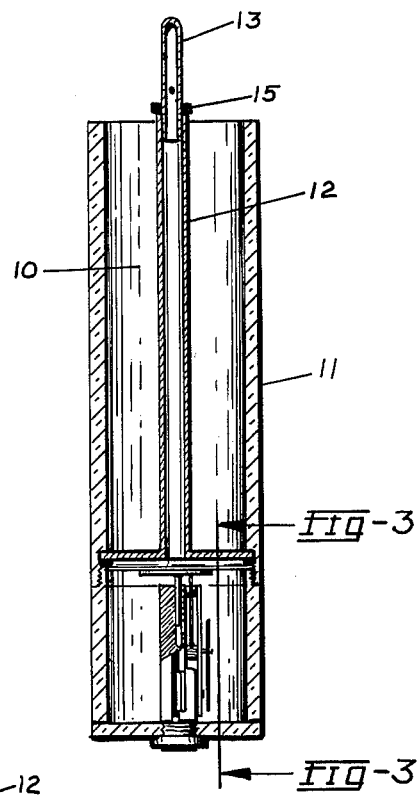
FIG. 2 is a cross-sectional view through the device showing the standpipe and its relationship to the diaphragm and the various mechanisms of the dial thereof.
Figure 3:
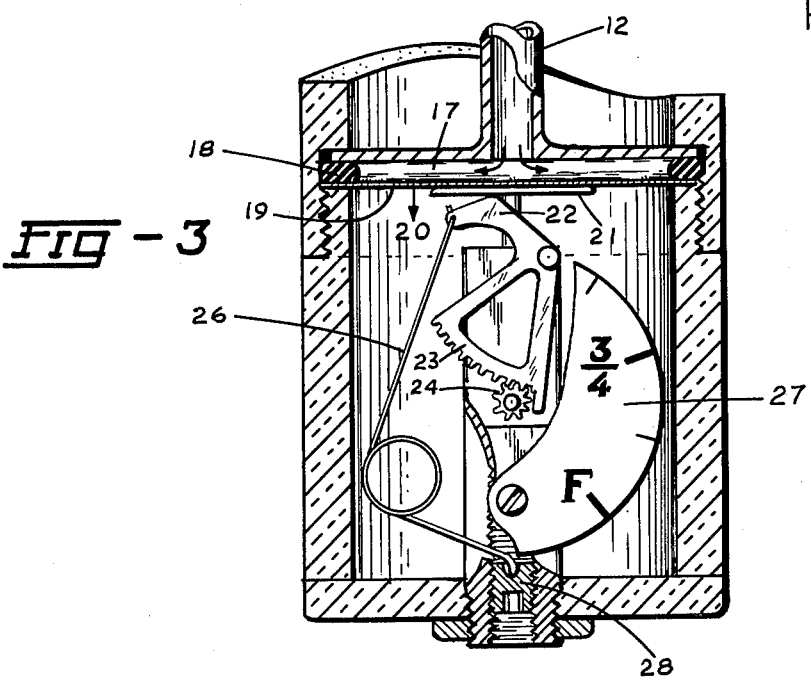
FIG. 3 is a detailed cross sectional view through the lower part of the device showing how the bottom part of the standpipe fits to the diaphragm and the various parts thereof.

The device is shown in FIG. 1 in its main outline. The space in the upper part of the cylinder, No. 10 is shown between the walls of the cylinder, No. 11 and the standpipe, No. 12, in the center of the cylinder. The standpipe at the top of the cylinder narrows to a pin, No. 13, with perforations therein, No. 14, with a collar or seal, No. 15 at the base of the pin just below the perforations. The bottom part of the cylinder, No. 16, contains the diaphragm and indicating mechanism. At the base of the standpipe, No. 12, which is hollow throughout, there is an opening in the disc which forms the base of the standpipe which fits just above the diaphragm, No. 19, with a gasket between them, No. 18, leaving a small space, No. 17, between the disc forming the base of the standpipe and the diaphragm. When the standpipe fills with fuel, the diaphragm is moved in the downward direction, No. 20, moving the small disc, No. 21, attached to the underside of the diaphragm, moving the arm, No. 22, the end of which arm No. 23, moves a small gear, No. 24, on which is attached the pointer, No. 25, which moves clockwise around the face of the dial, No. 27. The spring, No. 26, is attached to the arm, No. 22, and anchored at the base of the cylinder where the tension in the spring is controlled by a small screw, No. 28.

FIG. 4 is a view of a wing, with the wing tank shown, No. 30, and with the tank cap, No. 29. The present device is shown being inserted into the wing tank sump valve, No. 34. The pin, No. 13, is shown being inserted into the wing tank sump valve and forcing the poppet valve up, No. 35, opening various holes, No. 36, in the housing permitting fuel at the bottom of the tank to drain into the opening of the valve formed by the insertion of the pin, No. 13. Since the pin is of lesser circumference than the opening in the valve, fluid flows through the holes opened by the pushing up of the poppet valve, around the pin and into the container, No. 10. If it is desired only to test the fuel level in the tank the pin is pushed further into the wing tank sump valve until the seal, No. 15, is forced tight against the wing tank sump valve opening and allowing fuel to come only through the perforations in the pin, Numbers 14. The fuel, then, comes into the standpipe, No. 12, which is hollow throughout, down toward the base and through the opening in the disc which forms the base of the standpipe, into the space, No. 17, between the standpipe base and the diaphragm, No. 19. With the standpipe full, and the seal or collar, No. 15, pressed tight against the opening to the drain sump valve, sealing the fuel from escaping into the cylinder and only allowing it to flow into the perforations, No. 14, set in the pin, No. 13, the entire column of fuel, No. 32, in the wing tank, and in the standpipe of the device, No. 31, would be measured, once having calibrated the device against a full wing tank. The additional height of fuel in the standpipe of the device could then be ignored or compensated for in the adjustment of the screw, No. 28, controlling the tension in the spring. By adjusting the set screw and making the pointer, No. 25, point to "Full" on the dial, No. 27, when the wing fuel tank is known to be full the device is now calibrated and can be used to test the fuel level in high wing aircraft using similar fuel tanks.

Both the test for pollutants and the test for fuel level could be made at the same time by first taking a sample of the fuel by not forcing the collar against the valve and then after a sufficient sample is taken force the collar against the valve to just take the fuel level. But the gauge can be made without the cylinder, although it is convenient to have such a cylinder, which in that case, the device could be made much smaller and with much less height. In the latter case, the decreased size of the standpipe would minimize any error in the increased height of the fuel column above the diaphragm or any mechanism used to turn the arm.

The meter part of the device is sealed off from the rest of the device to make sure the mechanism is not fouled by the fuel. The gasket, No. 18, is used for that purpose. But, of course, many variations of this could be used and many types of gasket material used. The present invention has the lower part of the cylinder, No. 16, being screwed tight to the upper part of the cylinder, No. 11. But if the device was being used without the container, less fuel would contact the gasket and less stringent requirements for the gasket could be used.

The container, No. 11, can be made from either clear glass or plastic but such material should be of unbreakable design. The material should also resist any chemical activation with the fuel. The inventors have found that a container made from "Lexan" was well suited for this invention.

In FIG. 5, the side of the wing fuel tank is shown, No. 33 with its particular type of curvature. Although the wing fuel tanks may be of different types of contours, nevertheless, the wing tank sump valve, No. 34, would always be the lowest point in order to collect water and other pollutants since the density of the fuel would tend to be less than that of the pollutants.

If the device is made without a container for examining the fuel, the standpipe could be made very short thus minimizing any error in measuring the height of the column of fuel above the diaphragm or whatever mechanism is used to move the pointer. Or, if a container is used along with the device it could be made much smaller than the present container or cylinder. Or instead of using a container, the standpipe could be made slightly larger and the fuel contained in the standpipe could be examined as well as taking the fuel level against the diaphragm.

And the mechanism moving the pointer can be of different types. A bellows could be used instead of a diaphragm. Or some electronic traducer used which would be shown in some other way on some other kind of dial. But the present type was used because it would tend to be a fail safe device where if there was any failure on the part of the spring the device would tend to read less than what was actually in the fuel tank. This would tend to have the result of more care and concern about the level of fuel in the tank and result in a more thorough inspection than otherwise. Since tension in the spring is needed to move the dial to even show any fuel in the tank, discrepancies would force instant further inspection. The dial could be calibrated against the number of gallons of fuel contained in the tank and an easy calculation of the number of gallons in the fuel tank could easily be done.

The device could easily be used in any opening or valve in the fuel wing tank provided it is on the underside of the wing. And the device itself is conveniently small, easy to hold and handle in one hand and convenient to store until the next time it is used. Such a sturdy and small device could easily be stored upon the person for easy convenience of use. Pilots and mechanics could easily use same and keep same readily available.

While the invention has been described in conjunction with specific embodiments, there are many alternatives, modifications and variations that will be apparent to those skilled in the art, in light of the foregoing description. Accordingly, it is intended to embrace all such alternatives, modifications and variations as fall within the spirit and broad scope of the appended claims. It is also intended to embrace all equivalents and substitutes within the broad scope of this invention.

We claim:

1. A guage to measure fuel level in the fuel tanks of high wing airplanes where the gauge used to measure fuel level has a mechanism which is activated by means of the fuel pressure against it and which in turn activates a pointer on a dial which indicates the level of fuel in the tank wherein the improvement comprises:
   (a) a hollow standpipe, with the upper end narrowing down to a perforated pin slightly smaller than the opening in the fuel tank sump valve, when the pin is pushed into the opening of the wing tank sump valve, and
   (b) which when pushed into the wing tank sump valve opens the valve sufficiently to allow fuel to flow into the opening in which the pin is inserted and through the perforations in the pin into the hollow standpipe while a collar fits tight against the opening in the valve preventing fluid from leaking out, and
   (c) and continues to flow down through the standpipe through the opening in the base where it presses against a pressure means mechanism with the full weight of the level of fuel in the fuel tank, and
   (d) which pressure means mechanism moves an indicator means registering the level of fuel in the wing tank, and
   (e) which measurement of the fuel level in the high wing fuel tanks is taken by inserting the device into the fuel tank sump valve while standing under the wing of the aircraft.

2. A gauge to measure fuel level in the fuel tanks of high wing airplanes where the gauge used to measure fuel level has a mechanism means activated by the fuel pressure against it and which has indicator means to register the level of fuel in the tank wherein the improvement comprises:
   (a) a hollow standpipe with the upper end narrowed and perforated to fit into the fuel tank sump valve, and
   (b) when pushed upward into the fuel tank sump valve opens the valve draining some of the fuel into the hollow standpipe and down to the base of the standpipe pressing against a pressure mechanism means which pressure mechanism means activates an indicator means registering the amount of fuel in the fuel tank,
   (c) while at the same time allowing visual inspection of the fluid in the standpipe for water and other pollutants.

3. A method of measuring the fuel level in the fuel tanks of high wing airplanes using a gauge activated by pressure mechanism means which in turn by indicator means registers the level of fuel in the wing tanks wherein the improvement comprises:
   (a) standing under the wing tanks of high wing airplanes underneath the fuel tank sump valve, and
   (b) inserting into the valve of the fuel tank sump a pin both perforated and narrower than the opening into which it is inserted, and
   (c) draining into the hollow standpipe fuel flowing from the fuel tank sump, and
   (d) pressing against a pressure mechanism means at the base of the standpipe, and
   (e) activating an indicator means which registers the fuel level in the tank on a dial means, and
   (f) inspecting the fuel in the standpipe for water and other pollutants.

4. The claim as recited in claim 1 or claim 2 wherein the standpipe is encased in a transparent cylinder made from Lexan.

5. The claim as recited in claim 1 or claim 2 wherein the pressure means mechanism consists of a diaphragm which is made of a flexibile material.

6. The claim as recited in claim 1 or claim 2 wherein the indicator means consist of an arm resting against the diaphragm which when the arm moves turns a gear to which a pointer is attached which moves clockwise around the face of a dial.

7. The claim as recited in claim 1 or claim 2 wherein the hollow standpipe is made from transparent Lexan.

8. The claim as recited in claim 1 or claim 2 wherein the indicator means is made fail safe by causing the pointer to be moved clockwise around the face of a dial with the tension in the spring causing the pointer to be set at Empty and then moved by additional pressure on the spring to indicate some level of fuel in the wing fuel tank.

* * * * *